(12) United States Patent
Port

(10) Patent No.: US 10,408,077 B2
(45) Date of Patent: Sep. 10, 2019

(54) GAS TURBINE SEAL

(71) Applicant: United Technologies Corporation, Farmington, CT (US)

(72) Inventor: Daniel F. Port, Middletown, CT (US)

(73) Assignee: United Tehnologies Corporation, Farmington, CT (US)

(*) Notice: Subject to any disclaimer, the term of this patent is extended or adjusted under 35 U.S.C. 154(b) by 0 days.

(21) Appl. No.: 15/416,541

(22) Filed: Jan. 26, 2017

(65) Prior Publication Data

US 2018/0209290 A1 Jul. 26, 2018

(51) Int. Cl.
| | | |
|---|---|---|
| *F01D 11/10* | (2006.01) | |
| *F01D 5/02* | (2006.01) | |
| *F01D 9/04* | (2006.01) | |
| *F04D 29/08* | (2006.01) | |
| *F04D 29/32* | (2006.01) | |
| *F04D 29/54* | (2006.01) | |
| *F01D 11/02* | (2006.01) | |
| *F04D 29/10* | (2006.01) | |

(Continued)

(52) U.S. Cl.
CPC .............. *F01D 11/10* (2013.01); *F01D 5/02* (2013.01); *F01D 9/04* (2013.01); *F01D 11/02* (2013.01); *F04D 29/083* (2013.01); *F04D 29/102* (2013.01); *F04D 29/164* (2013.01); *F04D 29/321* (2013.01); *F04D 29/541* (2013.01); *F16J 15/4472* (2013.01); *F05D 2220/30* (2013.01); *F05D 2250/71* (2013.01)

(58) Field of Classification Search
CPC . F01D 11/10; F01D 11/02; F01D 5/02; F04D 29/083; F04D 29/102; F04D 29/164; F04D 29/321; F16J 15/4472; F05D 2220/30; F05D 2250/71

See application file for complete search history.

(56) References Cited

U.S. PATENT DOCUMENTS 1,651,855 A * 12/1927 Warren ................... F01D 11/02
 277/413
1,708,044 A * 4/1929 Baumann .............. F01D 11/001
 277/418

(Continued)

FOREIGN PATENT DOCUMENTS

JP S5912103 A 1/1984

OTHER PUBLICATIONS

Extended European Search Report for EP Application No. 18153087.4, dated Jun. 13, 2018, 8 pages.

*Primary Examiner* — Eugene G Byrd
(74) *Attorney, Agent, or Firm* — Kinney & Lange, P.A.

(57) ABSTRACT

A labyrinth seal includes a first annular member positioned on a center axis and a second annular member disposed circumferentially around the first annular member. A seal land is disposed on one of the first annular member and the second annular member. The seal land is positioned radially between the first annular member and the second annular member relative the center axis. A seal plate is disposed on the other of the first annular member and the second annular member. The seal plate extends radially toward the seal land and includes a plate body extending between a base and a tip of the seal plate. The plate body extends along a majority of a radial span of the seal plate on a first plane. The tip of the seal plate extends axially and radially away from the plate body on a second plane.

5 Claims, 6 Drawing Sheets

(51) Int. Cl.
*F04D 29/16* (2006.01)
*F16J 15/447* (2006.01)

(56) References Cited

U.S. PATENT DOCUMENTS

| | | | | |
|---|---|---|---|---|
| 1,756,958 A * | 5/1930 | Schmidt | ............... | F01D 11/02 |
| | | | | 277/419 |
| 1,831,224 A | 11/1931 | Baumann | | |
| 3,940,153 A * | 2/1976 | Stocker | ............... | F16J 15/4472 |
| | | | | 277/418 |
| 4,103,899 A * | 8/1978 | Turner | ............... | F01D 11/001 |
| | | | | 277/303 |
| 4,161,318 A * | 7/1979 | Stuart | ............... | B23P 6/002 |
| | | | | 277/431 |
| 5,211,535 A | 5/1993 | Martin et al. | | |
| 5,218,816 A * | 6/1993 | Plemmons | ............... | F01D 11/02 |
| | | | | 277/419 |
| 5,639,095 A * | 6/1997 | Rhode | ............... | F16J 15/4472 |
| | | | | 277/303 |
| 6,164,655 A * | 12/2000 | Bothien | ............... | F01D 11/02 |
| | | | | 277/303 |
| 6,932,350 B1 * | 8/2005 | Husted | ............... | F16J 15/406 |
| | | | | 277/421 |
| 8,167,547 B2 | 5/2012 | Wu et al. | | |
| 2001/0031201 A1 * | 10/2001 | Lawer | ............... | B23H 9/10 |
| | | | | 415/173.4 |
| 2005/0201859 A1 * | 9/2005 | Coulon | ............... | F01D 5/081 |
| | | | | 415/170.1 |
| 2008/0124215 A1 * | 5/2008 | Paolillo | ............... | F01D 11/001 |
| | | | | 415/173.7 |
| 2008/0263863 A1 * | 10/2008 | Rose | ............... | B23K 10/027 |
| | | | | 29/889.1 |
| 2009/0033037 A1 * | 2/2009 | Varanasi | ............... | F01D 11/005 |
| | | | | 277/355 |
| 2010/0074733 A1 * | 3/2010 | Little | ............... | F01D 11/001 |
| | | | | 415/173.5 |
| 2010/0098533 A1 * | 4/2010 | Grussmann | ............... | F01D 9/02 |
| | | | | 415/203 |
| 2010/0189542 A1 * | 7/2010 | Maltson | ............... | F01D 5/225 |
| | | | | 415/1 |
| 2011/0085892 A1 * | 4/2011 | John | ............... | F01D 11/10 |
| | | | | 415/171.1 |
| 2011/0280715 A1 * | 11/2011 | Garg | ............... | F01D 11/001 |
| | | | | 415/174.5 |
| 2012/0034072 A1 * | 2/2012 | Bagnall | ............... | F01D 11/001 |
| | | | | 415/170.1 |
| 2013/0115096 A1 * | 5/2013 | Itzel | ............... | F01D 5/288 |
| | | | | 416/241 B |
| 2013/0149118 A1 | 6/2013 | Lotfi et al. | | |

* cited by examiner

GAS TURBINE SEAL

BACKGROUND

The present disclosure relates to gas turbine engines, and more specifically to labyrinth seals which rotate with a gas turbine rotor.

Gas turbine engines are known, and typically include a series of sections. A fan may deliver air to a compressor section. Air is compressed in the compressor section by a series of compressor rotors, and delivered downstream to a combustor. In the combustor, air and fuel are combusted. The products of combustion then pass downstream over turbine rotors. The turbine rotors rotate to create power, and also to drive the fan and compressors.

The compressor rotors and turbine rotors are alternated with stationary vanes. It is desirable to limit air or combustion gas leakage between the rotors and stators so as to increase the work output and efficiency of the gas turbine engine. Thus, the compressor and turbine rotors are provided with labyrinth seals. Labyrinth seal structures are known. Labyrinth seals have evolved greatly through the life of gas turbines from thicker plate seals, to thin knife edges, brush seals and complicated stepped versions of these seals. Methods of stopping flow from traveling between rotors and stators are constantly improving as the need for greater engine efficiency increases.

SUMMARY

In one embodiment, a seal assembly for a turbine engine includes a rotor configured to rotate about a center axis. The seal assembly includes a seal land extending circumferentially around the center axis and spaced from the rotor so as to form a gap between the rotor and the seal land. A seal plate is connected to the rotor and extends circumferentially around the center axis. The seal plate extends from the rotor toward the seal land. The seal plate includes a first face extending radially from a base of the seal plate relative the center axis. The seal plate also includes a second face extending radially from the base of the seal plate. The second face is spaced axially forward from the first face relative the center axis. The seal plate also includes a first ramp face and a second ramp face. The first ramp face extends axially aft from the first face and extends radially from the first face toward the seal land. The second ramp face extends radially from the second face and axially aft from the second face to intersect with the first ramp face to form a tip of the seal plate.

In another embodiment, a labyrinth seal includes a first annular member positioned on a center axis and a second annular member disposed circumferentially around the first annular member. The first annular member and the second annular member form a flowpath therebetween with an upstream end and a downstream end. A seal land is disposed on one of the first annular member and the second annular member. The seal land is positioned radially between the first annular member and the second annular member relative the center axis. A seal plate is disposed on the other of the first annular member and the second annular member. The seal plate extends radially toward the seal land and includes a plate body extending between a base and a tip of the seal plate. The plate body extends along a majority of a radial span of the seal plate on a first plane. The tip of the seal plate extends axially and radially away from the plate body on a second plane.

In another embodiment, a labyrinth seal includes a seal plate and a seal land. The seal plate includes a radial span dimension extending from a base of the seal plate to a tip of the seal plate. The seal plate further includes a first portion that extends along a first plane from the base of the seal plate to a position beyond a midpoint of the radial span. A second portion of the seal plate extends along a second plane from the first portion to the tip. The second plane is canted with the first plane. The seal land is positioned proximate the tip of the seal plate.

Persons of ordinary skill in the art will recognize that other aspects and embodiments are possible in view of the entirety of the present disclosure, including the accompanying figures.

Figure 1:
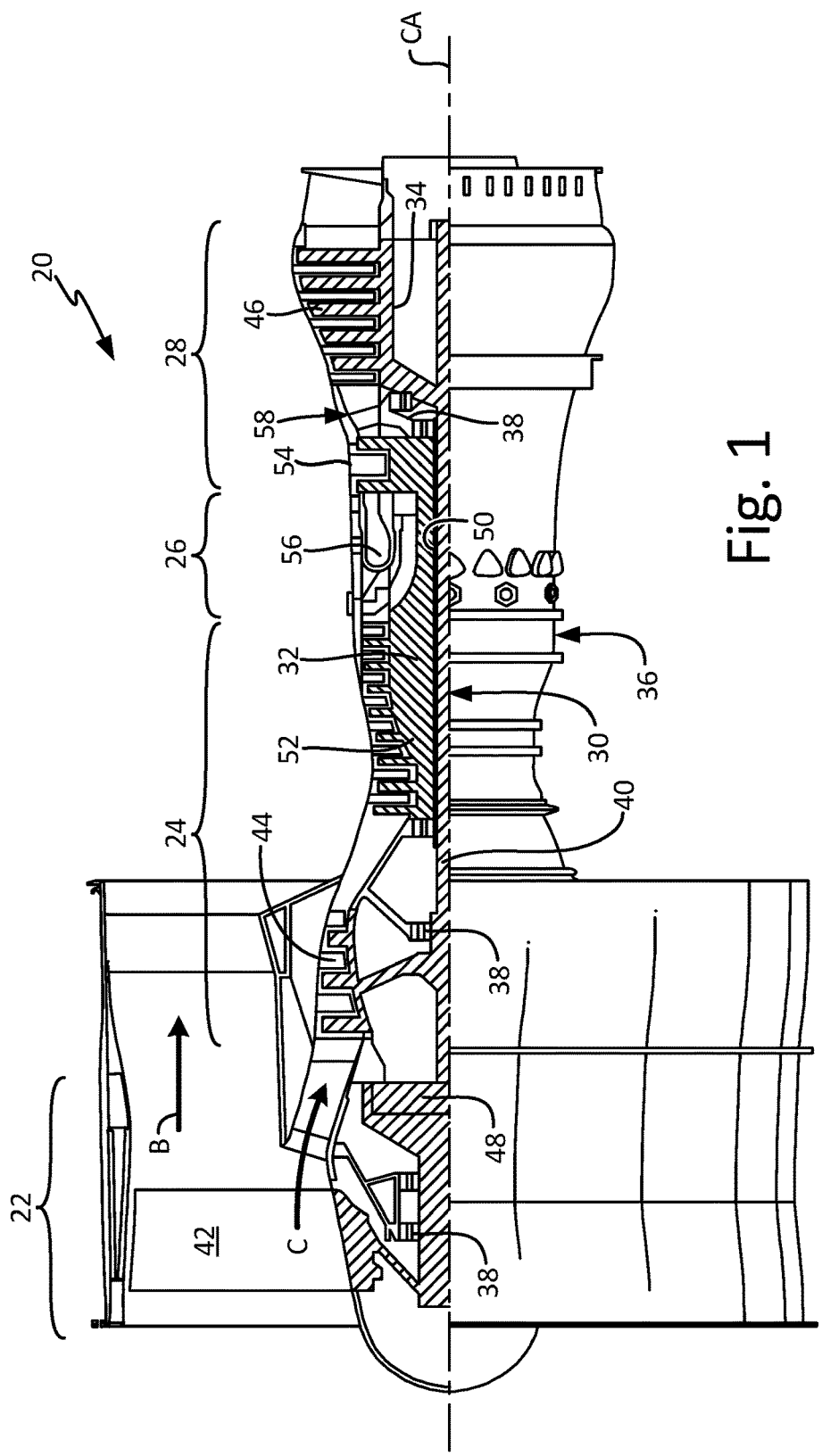
FIG. 1 is a partial cross-sectional view of a gas turbine engine.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a labyrinth seal for use in a gas turbine engine between a rotor and a stator. The labyrinth seal includes a seal plate extending radially from a rotor toward a seal land connected to the stator. A tip of the seal plate extends radially outward and upstream from the rest of the plate relative a leakage flow. Thus, the tip of the seal plate is "bent" relative the rest of the seal plate. Because the tip of the seal plate is bent and extends into the leakage flow upstream from the rest of the seal plate, the tip of the plate helps redirect the leakage flow in the opposite direction before traveling through the gap between the seal plate and the seal land. This encourages large flow separation and recirculation at the tip of the seal plate, effectively reducing the gap as this recirculation zone forms a cushion on top of the seal plate. The seal plate angles radially inward from the tip in the downstream direction which allows flow from the downstream side of the seal plate to recirculate up into the "dead zone" formed by the flow separation. This recirculation helps keep the effective gap between the seal plate and the seal land as small as possible. In use, the seal plate with the bent tip provides a better seal than previous seal plates and is more durable and easier to manufacture than aft-canted knife edge seals.

FIG. 1 is a quarter-sectional view that schematically illustrates example gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis CA of gas turbine engine 20 relative to engine static structure 36 via several bearing assemblies 38. It should be understood that various bearing assemblies 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing assemblies 38 about center axis CA.

Combustor 56 is arranged between high pressure compressor 52 and high pressure turbine 54. Mid-turbine frame 58 of engine static structure 36 can be arranged generally between high pressure turbine 54 and low pressure turbine 46. Mid-turbine frame 58 further supports bearing assemblies 38 in turbine section 28 as well as setting airflow entering the low pressure turbine 46. The core airflow C is compressed first by low pressure compressor 44 and then by high pressure compressor 52 mixed with fuel and ignited in combustor 56 to produce high speed exhaust gases that are then expanded through high pressure turbine 54, mid-turbine frame 58, and low pressure turbine 46. As discussed below with reference to FIGS. 2A and 2B, labyrinth seals 60 can be used in compressor section 24 and turbine section 28 to reduce leakage of the core airflow C between rotors and stators in those respective sections. Reducing leakage of the core airflow C increases the work output and fuel efficiency of gas turbine engine 20.

Figure 2A:
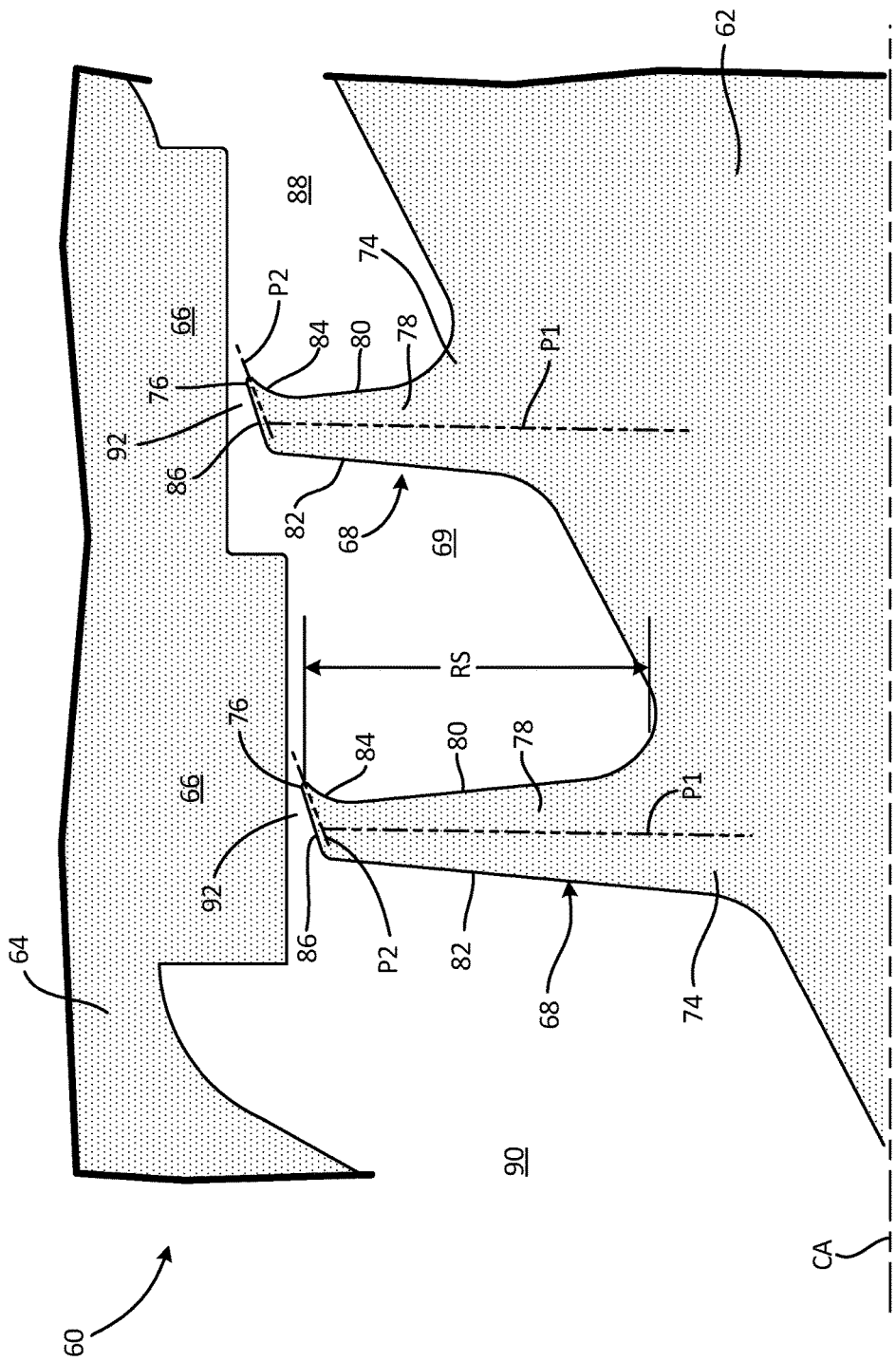
FIG. 2A is a cross-sectional view of a labyrinth seal assembly.
Figure 2B:
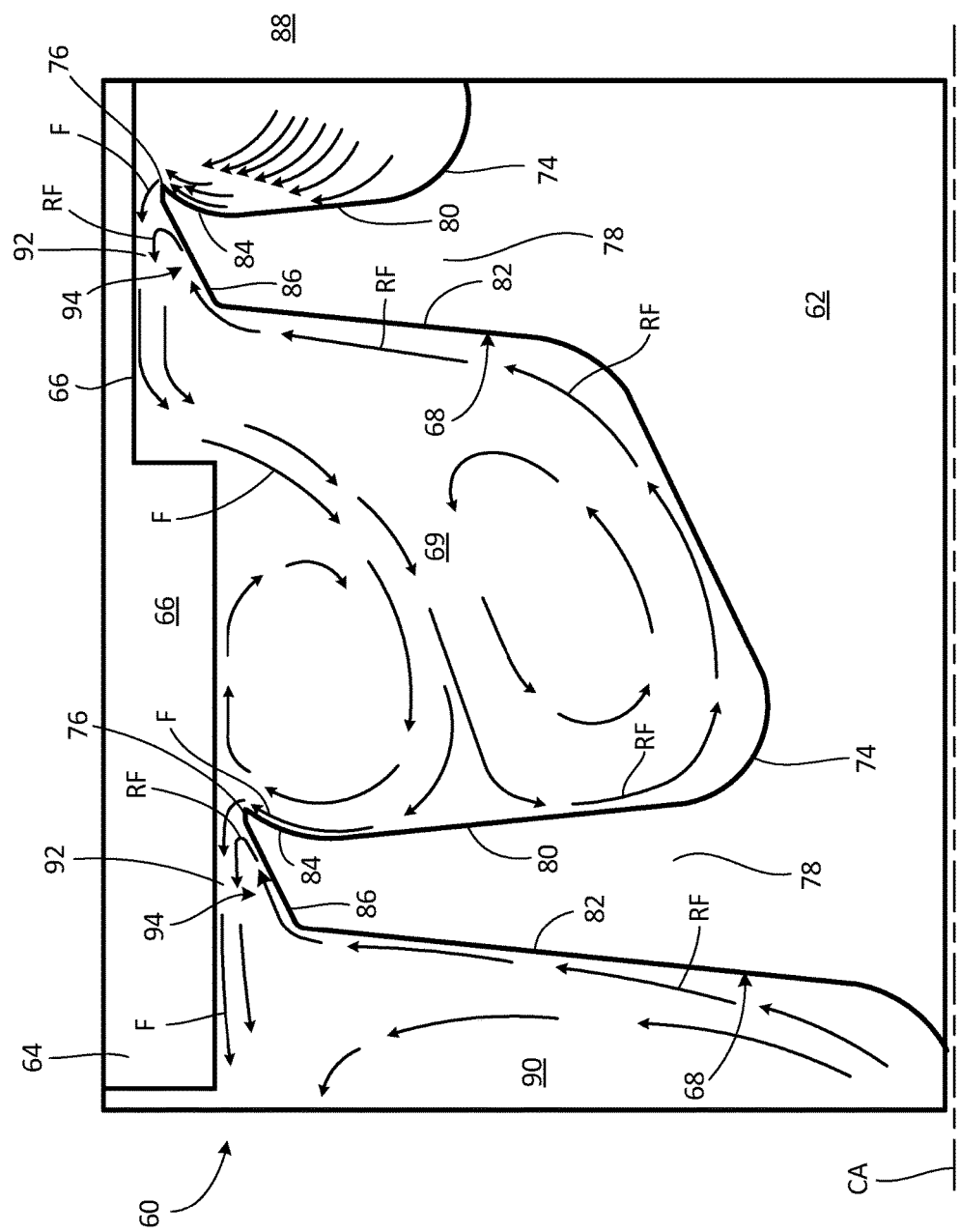
FIG. 2B is another cross-sectional view of the labyrinth seal assembly from FIG. 2A showing leakage flow across the labyrinth seal assembly.

FIGS. 2A and 2B will be discussed concurrently. FIG. 2A is a cross-sectional view of labyrinth seal 60, and FIG. 2B is another cross-sectional view of labyrinth seal 60 from FIG. 2A showing leakage flow F and recirculation flow RF in labyrinth seal 60. As shown in FIGS. 2A and 2B, labyrinth seal 60 includes rotor 62, stator 64, seal land 66, seal plates 68, and flowpath 69. Each seal plate 68 includes base 74, tip 76, plate body 78, radial span dimension RS, first face 80, second face 82, first ramp face 84, second ramp face 86, first plane P1, and second plane P2. For simplicity, radial span dimension RS, first plane P1, and second plane P2 are labeled only in FIG. 2A. Flowpath 69 includes upstream end 88, downstream end 90, and leakage gap 92. Dead zone 94, leakage flow F, and recirculation flow RF are shown in FIG. 2B.

Rotor 62 is a first annular member positioned on or about center axis CA and is configured to rotate about center axis CA. Rotor 62 can be disposed in compressor section 24 and turbine section 28, both shown in FIG. 1. In the embodiment of FIGS. 2A and 2B, rotor 62 is disposed in compressor section 24. Rotor 62 shown in FIGS. 2A and 2B can be a portion of inner shaft 40 or outer shaft 50 (both shown in FIG. 1), or rotor 62 can be connected to a root or support for a rotating airfoil.

Stator 64 is a second annular member disposed circumferentially about center axis CA and around rotor 62. Stator 64 can be part of a base, root, platform, or support for a vane, case, or other stationary structure in gas turbine engine 20. As shown in FIGS. 2A and 2B, stator 64 is spaced radially outward from rotor 62 to form a gap between rotor 62 and stator 64. This gap between rotor 62 and stator 64 forms flowpath 69 between rotor 62 and stator 64 which requires sealing. Flowpath 69 extends axially from downstream end 90 to upstream end 88. Because the embodiment of labyrinth seal 60 in FIGS. 2A and 2B is disposed in compressor section 24, upstream end 88 of flowpath 69 is positioned axially aft of downstream end 90 relative center axis CA where air pressure is greater during operation of gas turbine engine 20. During operation of gas turbine engine 20 a portion of pressurized core airflow C (represented as leakage flow F in FIG. 2B) will enter flowpath 69 at upstream end 88 and will attempt to flow axially forward through flowpath 69 to downstream end 90. Thus, seal land 66 and seal plates 68 are required for reducing leakage flow F in flowpath 69.

Seal land 66 is annular and extends circumferentially around center axis CA and is connected to stator 64. Seal land 66 is positioned radially between stator 64 and rotor 62 and is spaced radially outward from rotor 62 so that flowpath 69 is disposed between seal land 66 and rotor 62. Seal land 66 can include an abradable sealing material to allow seal plate 68 to wear into seal land 66 and provide a close fit between seal land 66 and seal plates 68. Seal land 66 can be stepped so as to accommodate both seal plates 68.

Seal plate 68 (two of which are shown in FIGS. 2A and 2B) is disposed on rotor 62 and extends circumferentially around rotor 62 and center axis CA. As shown in FIGS. 2A and 2B, seal plate 68 extends radially outward from rotor 62 toward seal land 66. Because seal plate 68 is connected to rotor 62, seal plate 68 rotates relative seal land 66. Seal plate 68 includes two portions. The first portion of seal plate 68 includes plate body 78 and the second portion of seal plate 68 includes tip 76. Plate body 78 is connected to rotor 62 at base 74 and extends radially outward along first plane P1. Plate body 78 extends radially from base 74 to first ramp face 84 and second ramp face 86 of tip 76. Plate body 78 can extend along a majority of radial span RS of seal plate 68 on first plane P1. Radial span RS is defined herein as the radial distance between base 74 of seal plate 68 and tip 76 of seal plate 68. Thus, plate body 78 forms the majority of seal plate 68.

Plate body 78 extends axially between first face 80 and second face 82. As shown in FIGS. 2A and 2B, first face 80 is disposed on an upstream and axially aft side of plate body 78 and extends circumferentially on plate body 78 around center axis CA. First face 80 extends radially on plate body 78 from base 74 to first ramp face 84 of tip 76 relative center axis CA. Second face 82 is disposed on a downstream and axially forward side of plate body 78 such that second face 82 is spaced axially forward from first face 80. Second face 82 extends circumferentially on plate body 78 around center axis CA and extends radially on plate body 78 from base 74 to second ramp face 86 of tip 76. A thickness of plate body 78 can be defined as the axial distance between first face 80 and second face 82. Plate body 78 can be thicker than a conventional knife-edge seal similarly situated as seal plate 68.

Tip 76 is formed by first ramp face 84 and second ramp face 86. First ramp face 84 extends axially aft and upstream from first face 80 and extends radially from first face 80 toward seal land 66. Second ramp face 86 extends radially from second face 82 and axially aft and upstream from second face 82 to intersect with first ramp face 84 to form tip 76. First ramp face 84, second ramp face 86, and tip 76 all extend circumferentially around center axis CA. Because first ramp face 84 and second ramp face 86 extend axially aftward and upstream of plate body 78, as shown in FIGS. 2A and 2B, tip 76 of seal plate 68 is disposed upstream and axially aftward of plate body 78. Tip 76 of seal plate 68 extends on second plane P2 (shown in FIG. 2A) axially aft or upstream from plate body 78 and radially away from plate body 78. Tip 76 can form a conical ruled surface that extends circumferentially around center axis CA and intersects plane P1 of plate body 78 at an angle so that tip 76 is canted relative plate body 78. Second ramp face 86 and tip 76 can both be positioned proximate seal land 66 without contacting seal land 66, such that leakage gap 92 is formed between seal land 66 and second ramp face 86 and extends axially between seal land 66 and second ramp face 86 of seal plate 68.

During operation of gas turbine engine 20, as shown in FIG. 2B, leakage flow F enters flowpath 69 at upstream end 88 and flows axially forward toward the first of seal plates 68. When leakage flow F reaches the first of seal plates 68, the majority of leakage flow F is forced radially outward by first face 80 toward first ramp face 84. Because first ramp face 84 extends axially aftward and upstream of first face 80, most of leakage flow F must turn aftward in order to flow around tip 76 and proceed forward into leakage gap 92. This turning of leakage flow F creates flow separation between leakage flow F and tip 76 as leakage flow F enters leakage gap 92. The flow separation between leakage flow F and tip 76 creates dead zone 94 between leakage flow F and second ramp face 86, which effectively narrows the flow area of the leakage gap 92 in the radial direction that leakage flow F is able to pass through.

Furthermore, because second ramp face 86 angles radially inward from tip 76 to second face 82, recirculation flow RF that circulates between the two seal plates 68 is directed into dead zone 94 by second ramp face 86. Inside dead zone 94, recirculation flow RF pushes leakage flow F radially outward against seal land 66 which increases the size of dead zone 94 and further decreases the effective flow area of leakage gap 92 between seal land 66 and seal plate 68. Thus first ramp face 84 and second ramp face 86 are able to reduce the amount of leakage flow F through leakage gap 92.

Figure 3:
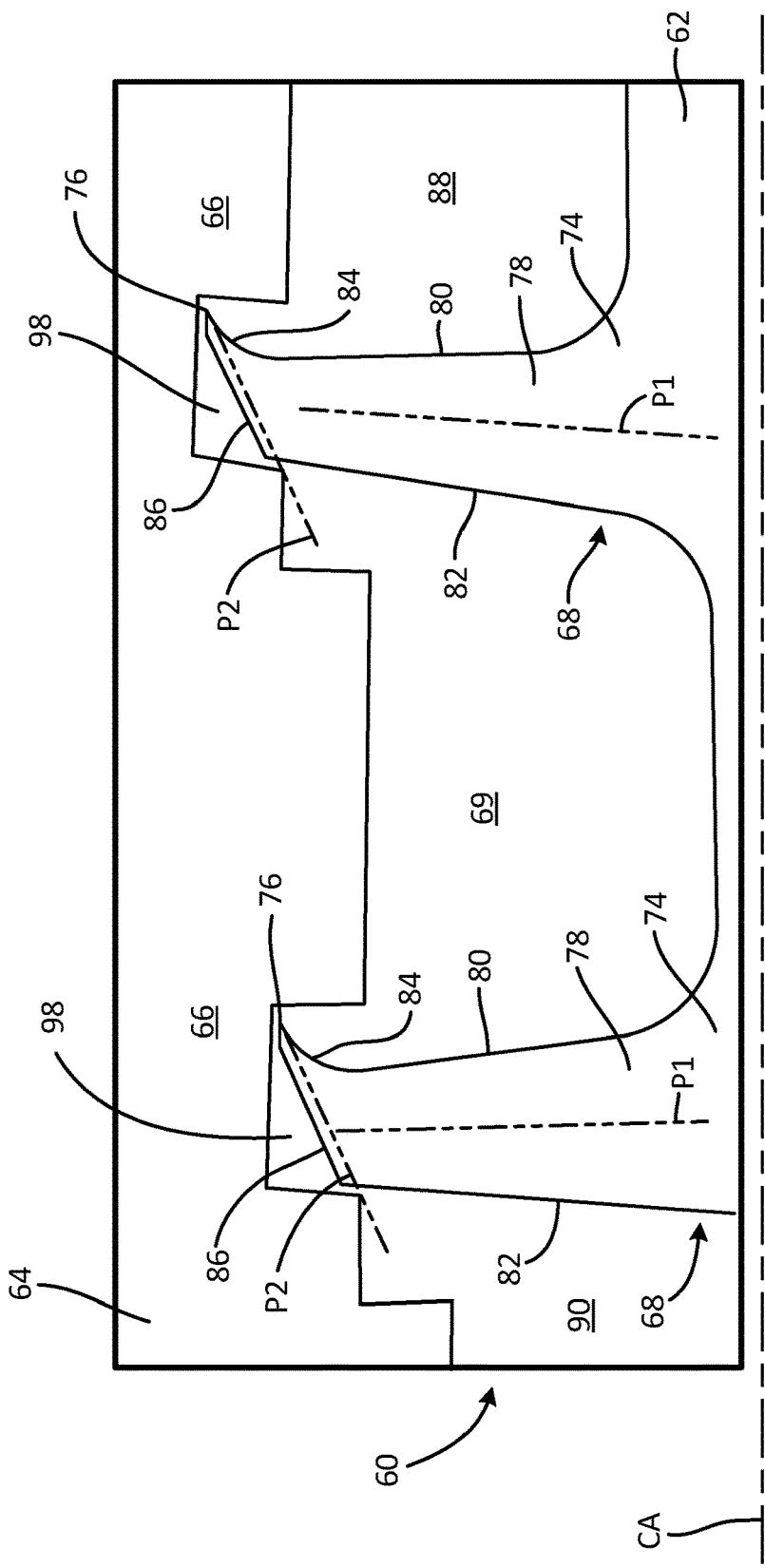
FIG. 3 is a cross-sectional view of another embodiment of a labyrinth seal assembly.
Figure 4:
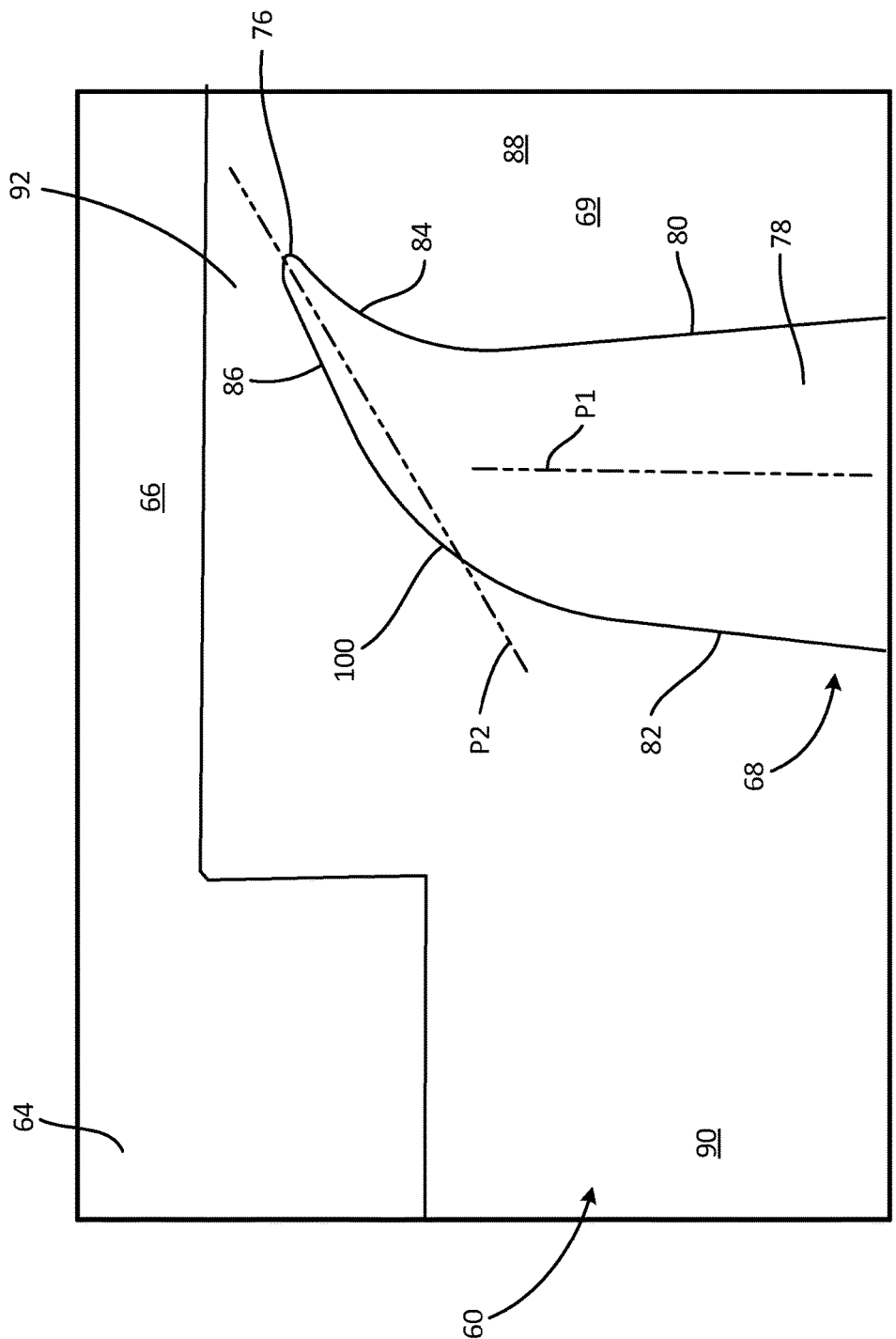
FIG. 4 is a cross-sectional view of another embodiment of a labyrinth seal assembly.
Figure 5:
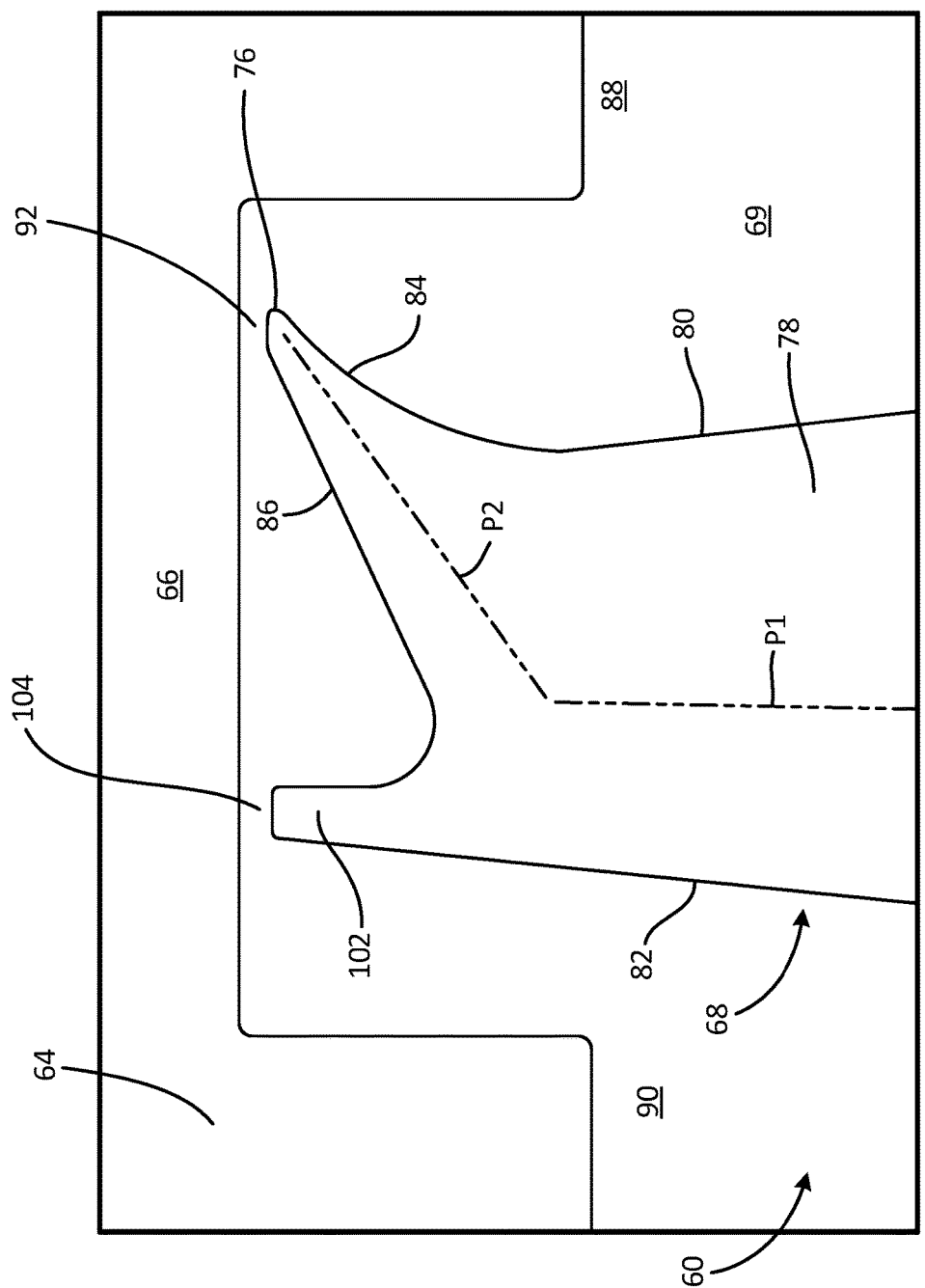
FIG. 5 is a cross-sectional view of another embodiment of a labyrinth seal assembly.

FIGS. 3-5 disclose additional embodiments of labyrinth seal 60. FIG. 3 is a cross-sectional view of labyrinth seal 60 with annular trench 98 formed in seal land 66. Annular trench 98 extends radially into seal land 66 and extends circumferentially along an entire inner circumference of seal land 66. As shown in FIG. 4, tip 76, first ramp face 84, and second ramp face 86 are all disposed inside annular trench 98. Leakage flow F can be further decreased across seal plate 68 by placing tip 76, first ramp face 84, and second ramp face 86 of seal plate 68 inside annular trench 98.

FIG. 4 is a cross-sectional view of labyrinth seal 60 with curved transition surface 100 formed on seal plate 68. As shown in FIG. 4, curved transition surface 100 is formed on the downstream side of seal plate 68 and extends between second face 82 and second ramp face 86 to create a smooth surface transition between second face 82 and second ramp face 86. During operation of gas turbine engine 20, curved transition surface 100 can help to effectively direct recirculation flow RF (shown in FIG. 2B) into dead zone 94 (shown in FIG. 2B) to effectively close leakage gap 92 and restrict leakage flow F (also shown in FIG. 2B).

FIG. 5 is a cross-sectional view of labyrinth seal 60 with flange 102 formed on seal plate 68 and second gap 104 formed between flange 102 and seal land 66. As shown in FIG. 5, flange 102 is positioned axially between second ramp face 86 and second face 82. Flange 102 is spaced axially downstream from tip 76. Flange 102 extends radially outward from plate body 78 toward seal land 66 and can be an extension of second face 82. During operation of gas turbine engine 20, flange 102 can aid tip 76 in restricting leakage flow F across labyrinth seal 60 by constricting leakage flow F downstream of tip 76 and gap 92.

In view of the foregoing description, it will be recognized that the present disclosure provides numerous advantages and benefits. For example, the present disclosure provides labyrinth seal 60 for use in gas turbine engine 20 between rotor 62 and stator 64. Labyrinth seal 60 includes seal plate 68 extending radially from rotor 62 toward seal land 66 connected to stator 64. Tip 76 of seal plate 68 extends radially outward and upstream from the rest of seal plate 68 relative leakage flow F. Because tip 76 of seal plate 68 extends upstream from the rest of seal plate 68, tip 76 helps redirect and turn leakage flow F before leakage flow F travels through gap 92 between seal plate 68 and seal land 66. This encourages large flow separation and recirculation at tip 76 of seal plate 68, which effectively reduces gap 92 as this recirculation zone forms a cushion or dead zone on top of seal plate 68. This recirculation helps keep the effective gap between seal plate 68 and seal land 66 as small as possible. Furthermore, seal plate 68 is more robust and easier to manufacture than conventional aft-canted knife edge seals and provides a better seal than previous conventional seal plates. Better seals increase engine stall margin and fuel efficiency.

The following are non-exclusive descriptions of possible embodiments of the present invention.

In one embodiment, a seal assembly for a turbine engine includes a rotor configured to rotate about a center axis. The seal assembly includes a seal land extending circumferentially around the center axis and spaced from the rotor so as to form a gap between the rotor and the seal land. A seal plate is connected to the rotor and extends circumferentially around the center axis. The seal plate extends from the rotor toward the seal land. The seal plate includes a first face extending radially from a base of the seal plate relative the center axis. The seal plate also includes a second face extending radially from the base of the seal plate. The second face is spaced axially forward from the first face relative the center axis. The seal plate also includes a first ramp face and a second ramp face. The first ramp face extends axially aft from the first face and extends radially from the first face toward the seal land. The second ramp face extends radially from the second face and axially aft from the second face to intersect with the first ramp face to form a tip of the seal plate.

The seal assembly of the preceding paragraph can optionally include, additionally and/or alternatively, any one or more of the following features, configurations and/or additional components:

the second ramp face is radially spaced from the seal land, and wherein a leakage flowpath extends axially between the second ramp face and the seal land;

the seal plate comprises a curved transition surface that extends between the second face and the second ramp face; and/or the seal land comprises an annular trench, and wherein the first ramp face and the second ramp face of the seal plate are disposed inside the annular trench.

In another embodiment, a labyrinth seal includes a first annular member positioned on a center axis and a second annular member disposed circumferentially around the first annular member. The first annular member and the second annular member form a flowpath therebetween with an upstream end and a downstream end. A seal land is disposed on one of the first annular member and the second annular member. The seal land is positioned radially between the first annular member and the second annular member relative the center axis. A seal plate is disposed on the other of the first annular member and the second annular member. The seal plate extends radially toward the seal land and includes a plate body extending between a base and a tip of the seal plate. The plate body extends along a majority of a radial span of the seal plate on a first plane. The tip of the seal plate extends axially and radially away from the plate body on a second plane.

The labyrinth seal of the preceding paragraph can optionally include, additionally and/or alternatively, any one or more of the following features, configurations and/or additional components:

the seal plate is disposed on the first annular member, and wherein the first annular member is a rotor configured to rotate about the center axis;

the seal land is disposed on the second annular member, and wherein the second annular member is a stator;

the tip of the seal plate extends axially upstream and radially outward from the plate body;

the seal land comprises an annular trench, and wherein the tip of the seal plate is disposed inside the annular trench; and/or the seal plate further comprises a flange extending radially away from the plate body toward the seal land, and wherein the flange is spaced axially from the tip.

In another embodiment, a labyrinth seal includes a seal plate and a seal land. The seal plate includes a radial span dimension extending from a base of the seal plate to a tip of the seal plate. The seal plate further includes a first portion that extends along a first plane from the base of the seal plate to a position beyond a midpoint of the radial span. A second portion of the seal plate extends along a second plane from the first portion to the tip. The second plane is canted with the first plane. The seal land is positioned proximate the tip of the seal plate.

The labyrinth seal of the preceding paragraph can optionally include, additionally and/or alternatively, any one or more of the following features, configurations and/or additional components:

the seal plate is configured to rotate relative the seal land;

the first portion of the seal plate comprises: a first face extending radially from the base of the seal plate to the second portion of the seal plate relative a center axis of the labyrinth seal; and a second face extending radially from the base of the seal plate to the second portion of the seal plate, wherein the second face is spaced axially forward from the first face relative the center axis;

the second portion of the seal plate comprises: a first ramp face that extends axially aft from the first face and extends radially from the first face toward the seal land; and a second ramp face that extends radially from the second face and axially aft from the second face to intersect with the first ramp face; and/or the seal land comprises an annular trench, and wherein the second portion of the seal plate extends into the annular trench.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A labyrinth seal comprising:
   a first annular member positioned on a center axis;
   a second annular member disposed circumferentially around the first annular member, wherein the first annular member and the second annular member form a flowpath therebetween with an upstream end and a downstream end;
   a seal land disposed on one of the first annular member and the second annular member, and positioned radially between the first annular member and the second annular member relative the center axis; and
   a seal plate disposed on the other of the first annular member and the second annular member, wherein the seal plate extends radially toward the seal land, wherein the seal plate comprises:
      a plate body extending between a base and a tip of the seal plate, wherein the plate body extends along a majority of a radial span of the seal plate on a first plane,
      wherein the tip of the seal plate extends axially and radially away from the plate body on a second plane, and
      a flange extending radially away from the plate body toward the seal land, and wherein the flange is spaced axially downstream from the tip.

2. The labyrinth seal of claim 1, wherein the seal plate is disposed on the first annular member, and wherein the first annular member is a rotor configured to rotate about the center axis.

3. The labyrinth seal of claim 2, wherein the seal land is disposed on the second annular member, and wherein the second annular member is a stator.

4. The labyrinth seal of claim 3, wherein the tip of the seal plate extends axially upstream and radially outward from the plate body.

5. The labyrinth seal of claim 4, wherein the seal land comprises an annular trench, and wherein the tip of the seal plate and the flange are both disposed inside the annular trench.

* * * * *